(12) United States Patent
Hou et al.

(10) Patent No.: US 11,966,806 B2
(45) Date of Patent: Apr. 23, 2024

(54) COMMODITY POSITIONING METHOD AND APPARATUS, DEVICE AND STORAGE MEDIUM

(71) Applicant: Hanshow Technology Co., Ltd., Zhejiang (CN)

(72) Inventors: Shiguo Hou, Zhejiang (CN); Min Liang, Zhejiang (CN); Jun Chen, Zhejiang (CN); Qi Jiang, Zhejiang (CN); Yang Zhao, Zhejiang (CN)

(73) Assignee: HANSHOW TECHNOLOGY CO., LTD., Zhejiang (CN)

( * ) Notice: Subject to any disclaimer, the term of this patent is extended or adjusted under 35 U.S.C. 154(b) by 690 days.

(21) Appl. No.: 17/039,246

(22) Filed: Sep. 30, 2020

(65) Prior Publication Data

US 2021/0073489 A1 Mar. 11, 2021

Related U.S. Application Data

(63) Continuation of application No. PCT/CN2019/070395, filed on Jan. 4, 2019.

(30) Foreign Application Priority Data

Apr. 3, 2018 (CN) .......................... 201810286097.5

(51) Int. Cl.
*G06Q 30/00* (2023.01)
*G06K 7/10* (2006.01)
(Continued)

(52) U.S. Cl.
CPC ..... *G06K 7/10366* (2013.01); *G06Q 30/0201* (2013.01); *G06T 7/70* (2017.01); *G06V 20/10* (2022.01); *H04W 4/35* (2018.02)

(58) Field of Classification Search
CPC ................................................ G06Q 30/06–08
See application file for complete search history.

(56) References Cited

U.S. PATENT DOCUMENTS 9,367,770 B2 6/2016 Footen
2005/0021561 A1* 1/2005 Noonan ............... G06Q 20/203
(Continued)

FOREIGN PATENT DOCUMENTS

CN 1900947 A 1/2007
CN 101149792 3/2008
(Continued)

OTHER PUBLICATIONS

Chinese First Office Action (with attached Englished translation) for Application No. 201810286097.5; dated Feb. 3, 2021; 18 pages.
(Continued)

*Primary Examiner* — Ethan D Civan
(74) *Attorney, Agent, or Firm* — NZ CARR LAW OFFICE

(57) ABSTRACT

The present disclosure provides a commodity positioning method and apparatus, a device and a storage medium. The method comprises: acquiring map information marked with multiple pieces of shelf identity information, wherein the multiple pieces of shelf identity information are in one-to-one correspondence with shelves; acquiring shelf image information corresponding to the shelf identity information; identifying, according to the shelf image information, a commodity corresponding to each of electronic price label apparatuses on a corresponding shelf and a first positional relationship between each of the electronic price label apparatuses and the corresponding shelf; generating location information of each of the commodities according to the first positional relationship and the map information.

16 Claims, 5 Drawing Sheets

(51) Int. Cl.
  *G06Q 30/0201* (2023.01)
  *G06T 7/70* (2017.01)
  *G06V 20/10* (2022.01)
  *H04W 4/35* (2018.01)

(56) References Cited

U.S. PATENT DOCUMENTS

2008/0077511 A1\* 3/2008 Zimmerman ........ G06Q 10/087
                                                              705/28
2018/0053231 A1\* 2/2018 Clark ................ G06K 7/10386

FOREIGN PATENT DOCUMENTS

| CN | 101149792 A | 3/2008 |
| CN | 102750274   | 10/2012 |
| CN | 102750274 A | 10/2012 |
| CN | 203588313 U | 5/2014 |
| CN | 106355461   | 1/2017 |
| CN | 106355461 A | 1/2017 |
| JP | 2001116583  | 4/2001 |
| JP | 2010049494  | 3/2010 |
| JP | 2010049494 A | 3/2010 |
| JP | 2017014014  | 1/2017 |
| WO | 2017201490  | 11/2017 |

OTHER PUBLICATIONS

Chinese Search Report (with attached English translation) for Application No. 201810286097.5; dated Apr. 9, 2021; 3 pages.
International search report issued for counterpart Chinese patent application No. PCT/CN2019/070395 dated Mar. 6, 2019.
First Office Action issued for corresponding Japanese Patent Application 2020-554066 mailed on Jan. 4, 2022.
Decision of Dismissal of Amendment by the Japan Patent Office issued for corresponding Japanese Patent Application 2020-554066 mailed on Jul. 26, 2022 with an English translation.
Extended European Search Report issued on Dec. 14, 2021 for counterpart European patent application No. 19780593.0.

\* cited by examiner

COMMODITY POSITIONING METHOD AND APPARATUS, DEVICE AND STORAGE MEDIUM

This application is a continuation of International Application No. PCT/CN2019/070395, filed on Jan. 4, 2019, which claims priority to Chinese patent application No. 201810286097.5, filed on Apr. 3, 2018 and entitled "Commodity positioning method and apparatus, device and storage medium", both of which are hereby incorporated by reference in their entireties.

TECHNICAL FIELD

The present disclosure relates to the technical field of supermarket shopping, and in particular to a commodity positioning method and apparatus, a map acquisition apparatus, an image acquisition apparatus, a commodity positioning system, a device and a storage medium.

BACKGROUND

For large-scale supermarkets, there have always been business needs such as real-time goods search and commodity shopping guide. The traditional way relying on the artificial shopping guide is very labor-intensive on one hand, and on the other hand, it is sometimes difficult to accurately meet the requirements by relying on the artificial memory. How to automatically position a wide variety of commodities in the supermarkets is a topic.

The traditional indoor positioning solutions include ibeacon, uwb, wife fingerprint, and so on. The positioning accuracies of these solutions are above 1 m, and errors of some solutions even reach 10 m, which is difficult to meet the positioning needs of densely displayed commodities.

SUMMARY

In view of the above defects or shortages in the prior art, it is desirable to provide a commodity positioning method and apparatus, a device and a storage medium for automatically and accurately positioning densely displayed commodities.

In a first aspect, the present disclosure provides a commodity positioning method applicable to a commodity positioning apparatus, comprising:
  acquiring map information marked with multiple pieces of shelf identity information, wherein the multiple pieces of shelf identity information are in one-to-one correspondence with shelves;
  acquiring shelf image information corresponding to the shelf identity information;
  identifying, according to the shelf image information, a commodity corresponding to each of electronic price label apparatuses on a corresponding shelf and a first positional relationship between each of the electronic price label apparatuses and the corresponding shelf;
  generating location information of each of the commodities according to the first positional relationship and the map information.

In a second aspect, the present disclosure provides a commodity positioning method applicable to a map acquisition apparatus, comprising:
  acquiring and constructing map data, and acquiring shelf identity information of each of shelves, wherein the shelf identity information is in one-to-one correspondence with the shelves;
  marking the map data according to each of the shelf identity information, and generating map information marked with multiple pieces of shelf identity information;
  transmitting the map information to a commodity positioning apparatus or uploading and storing the map information for acquisition by the commodity positioning apparatus, which enables the commodity positioning apparatus to:
  acquire shelf image information corresponding to the shelf identity information;
  identify, according to the shelf image information, a commodity corresponding to each of electronic price label apparatuses on a corresponding shelf and a first positional relationship between each of the electronic price label apparatuses and the corresponding shelf;
  generate location information of each of the commodities according to the first positional relationship and the map information.

In a third aspect, the present disclosure provides a commodity positioning method applicable to an image acquisition apparatus, comprising:
  scanning radio frequency identification labels provided for shelves to acquire shelf identity information of the shelves, wherein the shelf identity information is in one-to-one correspondence with the shelves;
  acquiring image information of the shelves;
  binding the shelf identity information with the image information to generate shelf image information;
  transmitting the shelf image information to a commodity positioning apparatus, or uploading and storing the shelf image information for acquisition by the commodity positioning apparatus, which enables the commodity positioning apparatus to:
  acquire map information marked with multiple pieces of shelf identity information;
  identify, according to the shelf image information, a commodity corresponding to each of electronic price label apparatuses on a corresponding shelf and a first positional relationship between each of the electronic price label apparatuses and the corresponding shelf;
  generate location information of each of the commodities according to the first positional relationship and the map information.

In a fourth aspect, the present disclosure provides a commodity positioning apparatus, comprising an information acquisition unit, an identification unit and a positioning unit;
  the information acquisition unit is configured to acquire map information marked with multiple pieces of shelf identity information, and acquire shelf image information corresponding to the shelf identity information, wherein the shelf identity information is in one-to-one correspondence with shelves;
  the identification unit configured to identify, according to the shelf image information, a commodity corresponding to each of electronic price label apparatuses on a corresponding shelf and a first positional relationship between each of the electronic price label apparatuses and the corresponding shelf;
  the positioning unit configured to generate location information of each of the commodities according to the first positional relationship and the map information.

In a fifth aspect, the present disclosure provides a map acquisition apparatus, comprising: a map construction unit, a first shelf acquisition unit, a marking unit and a first output unit;

a map construction unit configured to acquire and construct map data;

a first shelf acquisition unit configured to acquire shelf identity information of each of shelves, wherein the shelf identity information is in one-to-one correspondence with the shelves;

a marking unit configured to mark the map data according to each of the shelf identity information to generate map information marked with multiple pieces of shelf identity information;

a first output unit configured to transmit the map information to a commodity positioning apparatus or upload and store the map information for acquisition by the commodity positioning apparatus, which enables the commodity positioning apparatus to:

acquire shelf image information corresponding to the shelf identity information;

identify, according to the shelf image information, a commodity corresponding to each of electronic price label apparatuses on a corresponding shelf and a first positional relationship between each of the electronic price label apparatuses and the corresponding shelf;

generate location information of each of the commodities according to the first positional relationship and the map information.

In a sixth aspect, the present disclosure provides an image acquisition apparatus, comprising a second shelf acquisition unit, an image acquisition unit, a binding unit and a second output unit;

a second shelf acquisition unit configured to scan radio frequency identification labels provided for shelves to acquire shelf identity information of the shelves, wherein the shelf identity information is in one-to-one correspondence with the shelves;

an image acquisition unit configured to acquire image information of the shelves;

a binding unit configured to bind the shelf identity information with the image information to generate shelf image information;

a second output unit configured to transmit the shelf image information to a commodity positioning apparatus, or upload and store the shelf image information for acquisition by the commodity positioning apparatus, which enables the commodity positioning apparatus to:

acquire map information marked with multiple pieces of shelf identity information;

identify, according to the shelf image information, a commodity corresponding to each of electronic price label apparatuses on a corresponding shelf and a first positional relationship between each of the electronic price label apparatuses and the corresponding shelf;

generate location information of each of the commodities according to the first positional relationship and the map information.

In a seventh aspect, the present disclosure provides a commodity positioning system, comprising the above commodity positioning apparatus, a plurality of the above map acquisition apparatuses, a plurality of the above image acquisition apparatuses, and radio frequency identification labels and electronic price label apparatuses provided on each of the shelves.

In an eighth aspect, the present disclosure further provides a device, comprising one or more processors and a memory, wherein the memory contains instructions executable by the one or more processors to enable the one or more processors to perform the commodity positioning method provided by the embodiments of the present disclosure.

In a ninth aspect, the present disclosure further provides a storage medium with a computer program stored thereon, wherein the computer program enables a computer to perform the commodity positioning method provided by each of the embodiments of the present disclosure.

The commodity positioning method and apparatus, the device and the storage medium provided by various embodiments of the present disclosure acquire the map information marked with the shelf identity information, and the shelf image information that can be used to identify the locations of the electronic price label apparatuses on the shelves, thereby positioning the shelves on the map and positioning the commodities corresponding to the electronic price label apparatuses on the shelves, so as to automatically and accurately position the commodities in the dense display environment of the supermarket.

The commodity positioning method and apparatus, the device and the storage medium provided by some embodiments of the present disclosure further complete the automatic acquisition of the map information marked with the shelf identity information through a robot or a shopping cart component, which is provided with a map construction system and a radio frequency identification reader, thereby further reducing the labor consumption.

The commodity positioning method and apparatus, the device and the storage medium provided by some embodiments of the present disclosure further complete the automatic acquisition of the shelf image information through an electronic price label apparatus, an intelligent mobile terminal apparatus or a robot, which is provided with an image acquisition apparatus and a radio frequency identification reader, thereby further reducing the labor consumption.

BRIEF DESCRIPTION OF DRAWINGS

By reading the detailed description of the non-limiting embodiments with reference to the following drawings, other features, objects and advantages of the present disclosure will become more apparent.

DETAILED DESCRIPTION

Figure 1:
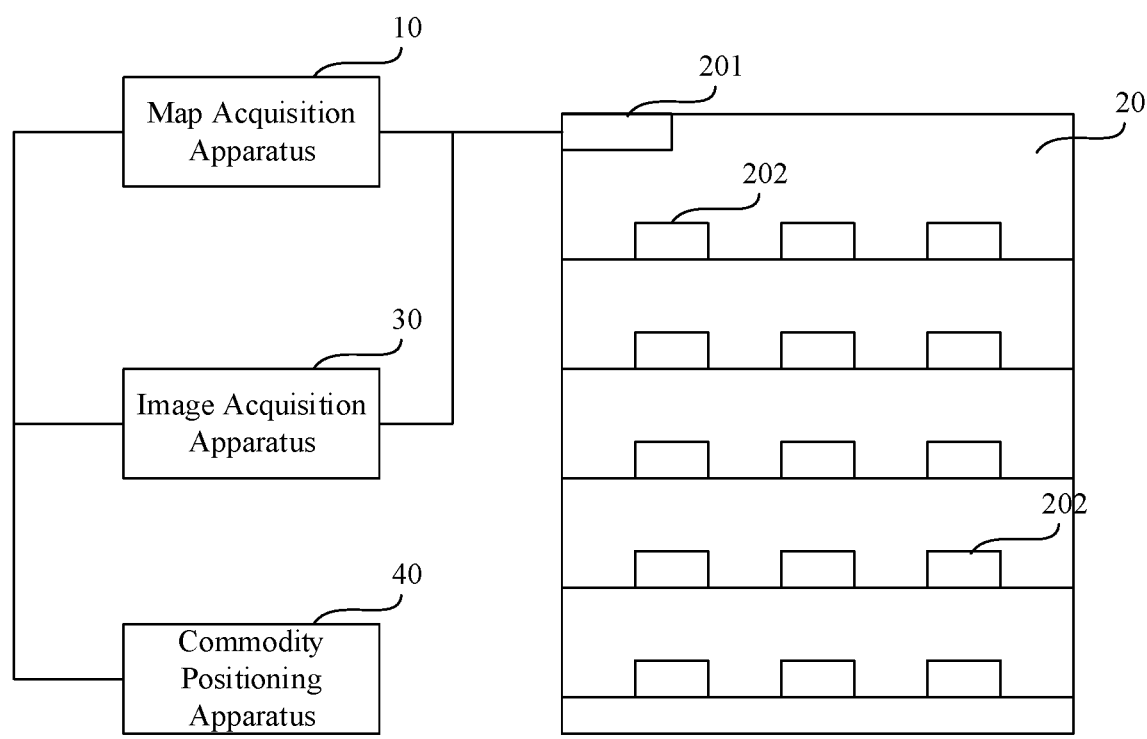
FIG. 1 illustrates a schematic diagram of an application scenario of an embodiment of the present disclosure.

The present disclosure will be further described in detail below with reference to the drawings and in conjunction with the embodiments. It can be understood that the specific embodiments described here are only used to explain the related invention, rather than limiting the invention. In addition, it should be noted that, for the convenience of description, only the parts related to the invention are illustrated in the drawings.

It should be noted that the embodiments in the present disclosure and the features in the embodiments can be combined with each other if there is no conflict. Hereinafter, the present disclosure will be described in detail with reference to the drawings and in conjunction with the embodiments.

FIG. 1 illustrates a schematic diagram of an application scenario of an embodiment of the present disclosure. As illustrated in FIG. 1, in an application scenario of this embodiment, it is provided with a plurality of shelves 20 (one shelf is taken as an example in FIG. 1) in a supermarket environment, and each of the shelves 20 is provided with an identity information provision apparatus 201 for a map acquisition apparatus 10 and an image acquisition apparatus 30 to acquire shelf identity information of the shelf 20, respectively.

Each of the shelves 20 is further provided with a plurality of electronic price label apparatuses 202 each corresponding to a commodity, so that commodity positioning can be realized by positioning the electronic price label apparatuses 202.

In this embodiment, the identity information provision apparatus 201 is configured as a radio frequency identification (RFID) label, and the map acquisition apparatus 10 and the image acquisition apparatus 30 can read the shelf identity information transmitted by the RFID label by being provided with a radio frequency identification reader. In other embodiments, the identity information provision apparatus 201 may also be configured as a conventional wireless communication apparatus in the art, such as a Bluetooth apparatus, or the electronic price label apparatus 202 may be used as a provision device of the shelf identity information, which can achieve the same technical effect.

The commodity positioning principle of the present disclosure will be described in detail below with reference to FIG. 2.

Figure 2:
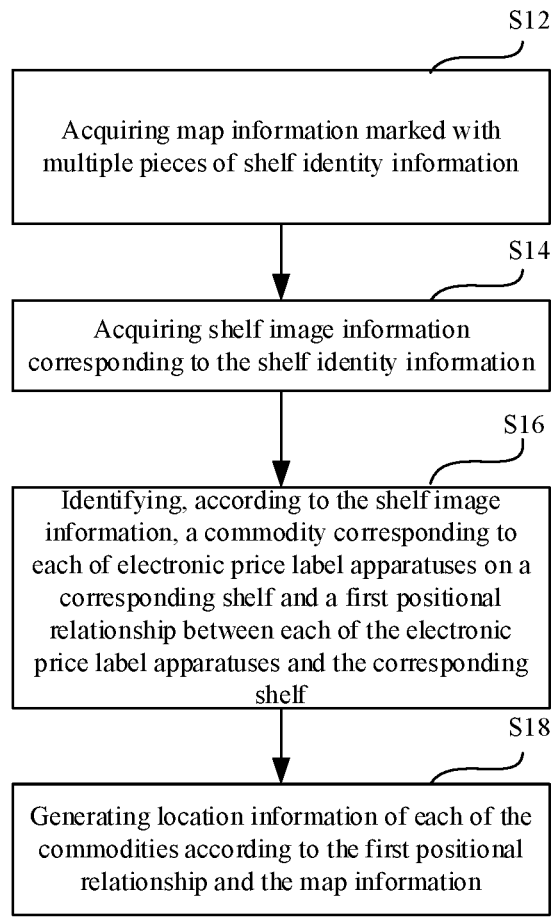
FIG. 2 illustrates a flowchart of a commodity positioning method provided by an embodiment of the present disclosure.

FIG. 2 illustrates a flowchart of a commodity positioning method provided by an embodiment of the present disclosure. As illustrated in FIG. 2, in this embodiment, the present disclosure provides a commodity positioning method applicable to a commodity positioning apparatus 40, comprising:

S12: acquiring map information marked with multiple pieces of shelf identity information, wherein the multiple pieces of shelf identity information are in one-to-one correspondence with shelves;

S14: acquiring shelf image information corresponding to the shelf identity information;

S16: identifying, according to the shelf image information, a commodity corresponding to each of electronic price label apparatuses on a corresponding shelf and a first positional relationship between each of the electronic price label apparatuses and the corresponding shelf;

S18: generating location information of each of the commodities according to the first positional relationship and the map information.

Specifically, in step S12, the commodity positioning apparatus 40 acquires, from a server, map information pre-generated by the map acquisition apparatus 10 and uploaded to the server for storage. In which, the map acquisition apparatus 10 acquires and constructs map data through a Simultaneous Localization and Mapping (SLAM) system on the one hand, and acquires shelf identity information transmitted by a radio frequency identification label of each of the shelves 20 through the radio frequency identification reader on the other hand, so as to mark the location and the identity of the shelf 20 in the map in real time when the shelf identity information is acquired, and generate map information marked with the shelf identity information. In another embodiment, the commodity positioning apparatus 40 may directly receive the pre-generated map information transmitted by the map acquisition apparatus 10, which can achieve the same technical effect.

In this embodiment, the map acquisition apparatus 10 is configured as a plurality of robots provided with map construction systems and radio frequency identification readers. In other embodiments, according to the actual needs, the map acquisition apparatus 10 may also be configured as a plurality of shopping cart components provided with map construction systems and radio frequency identification readers and provided on a shopping cart; or a combination of the robots and the shopping cart components mentioned above, etc.

In step S14, the commodity positioning apparatus 40 acquires, from the server, shelf image information pre-generated by the image acquisition apparatus 30 and uploaded to the server for storage. In which, after acquiring the shelf identity information of the shelf 20, the image acquisition apparatus 30 acquires the image information of the shelf 20, such as taking a picture, continuously taking pictures or shooting a video for the shelf 20, and then binds the shelf identity information of the shelf 20 with the image information to generate the shelf image information of the shelf 20. The image acquisition apparatus 30 performs the above image acquisition on each of the shelves 20 in the supermarket environment to generate the shelf image information of each of the shelves 20. In another embodiment, the commodity positioning apparatus 40 may also directly receive the shelf image information of each of the shelves 20 transmitted by the image acquisition apparatus 30, which can achieve the same technical effect.

In this embodiment, the image acquisition apparatus 30 is configured as a plurality of robots provided with image acquisition apparatuses and radio frequency identification readers. The robot provided with the image acquisition apparatus and the radio frequency identification reader may be simultaneously provided with a map construction system, which serves as the map acquisition apparatus 10 when performing a map acquisition task and serves as the image acquisition apparatus 30 when performing an image acquisition task. A first type of robot serving as the map acquisition apparatus 10 and a second type of robot serving as the image acquisition apparatus 30 may also be configured separately. In other embodiments, according to the actual needs, the image acquisition apparatus 30 may also be configured as a plurality of intelligent mobile terminal devices, such as mobile phones and tablets, which are provided with image acquisition apparatuses and radio frequency identification readers, or electronic price label apparatuses provided with image acquisition apparatuses and radio frequency identification readers, or any combination of the robots, the intelligent mobile terminal devices and the electronic price label apparatuses mentioned above, etc.

In step S16, the commodity positioning apparatus 40 identifies a commodity corresponding to each of the electronic price label apparatuses on a corresponding shelf according to the shelf image information acquired in step S14, and a first positional relationship between each of the electronic price label apparatuses and the corresponding shelf.

For example, regarding the shelf A1, 15 commodities respectively corresponding to 15 electronic price label apparatuses A1-1 to A1-15 on the shelf A1 may be identified according to the shelf image information of the shelf A1, and the first positional relationships between the 15 electronic price label apparatuses and the shelf A1, so as to determine the specific locations of the 15 commodities on the shelf A1 in the subsequent step S18.

In step S18, the commodity positioning apparatus 40 determines the position of each of the shelves 20 in the map according to the map information acquired in step S12, and then determines the positional relationship between each of the commodities and the corresponding shelf according to the corresponding relationship between the commodity and the electronic price label apparatus identified in step S16 and the first positional relationship between the electronic price label apparatus and the shelf, so as to finally determine the locations of the commodities, and ultimately generate and output the location information of each of the commodities for applications such as automatic prompting or automatic shopping guide.

Figure 3:
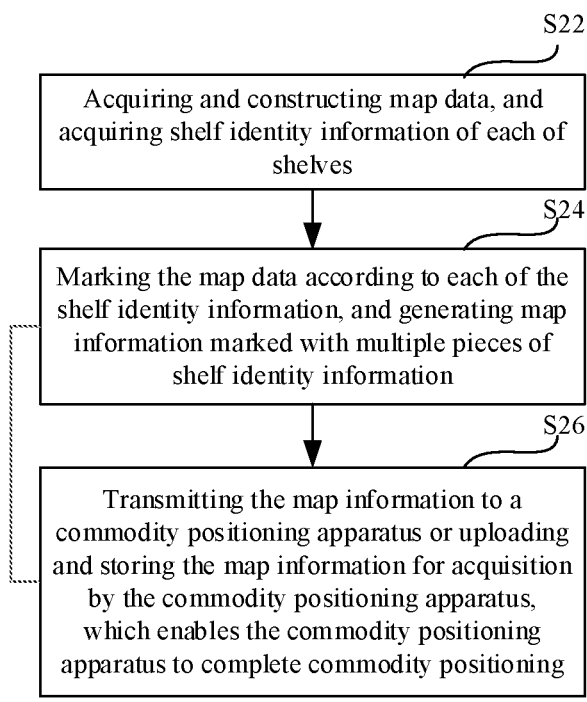
FIG. 3 illustrates a flowchart of another commodity positioning method provided by an embodiment of the present disclosure.

FIG. 3 illustrates a flowchart of another commodity positioning method provided by an embodiment of the present disclosure. The method illustrated in FIG. 3 may cooperate with the method illustrated in FIG. 2 for commodity positioning. As illustrated in FIG. 3, the present disclosure further provides a commodity positioning method applicable to the map acquisition apparatus 10, comprising:

S22: acquiring and constructing map data, and acquiring shelf identity information of each of shelves, wherein the shelf identity information is in one-to-one correspondence with the shelves;

S24: marking the map data according to each of the shelf identity information, and generating map information marked with multiple pieces of shelf identity information;

S26: transmitting the map information to a commodity positioning apparatus or uploading and storing the map information for acquisition by the commodity positioning apparatus, which enables the commodity positioning apparatus to:
  acquire shelf image information corresponding to the shelf identity information;
  identify, according to the shelf image information, a commodity corresponding to each of electronic price label apparatuses on a corresponding shelf and a first positional relationship between each of the electronic price label apparatuses and the corresponding shelf;
  generate location information of each of the commodities according to the first positional relationship and the map information.

Specifically, the commodity positioning principle of the method illustrated in FIG. 3 may refer to that of the method illustrated in FIG. 2, and will not be repeated here.

Figure 4:
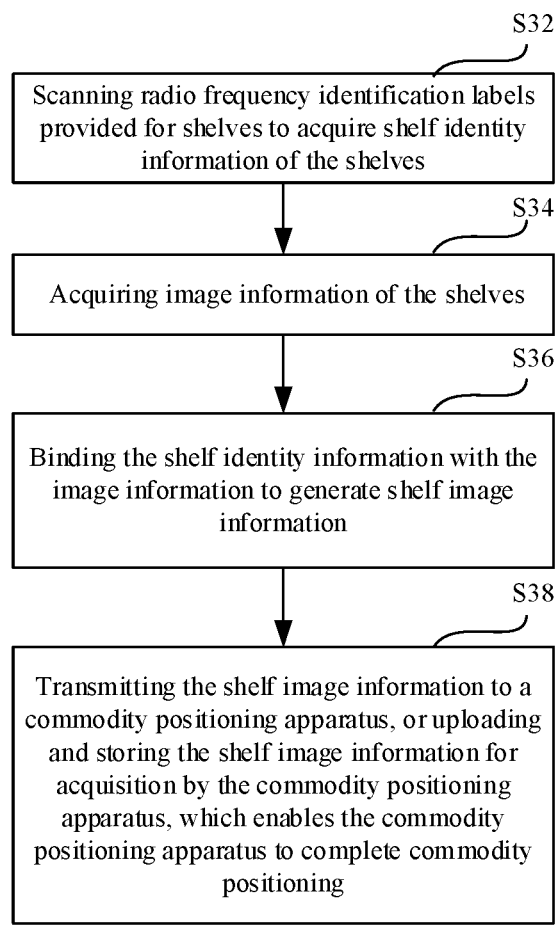
FIG. 4 illustrates a flowchart of still another commodity positioning method provided by an embodiment of the present disclosure.

FIG. 4 illustrates a flowchart of another commodity positioning method provided by an embodiment of the present disclosure. The method illustrated in FIG. 4 may cooperate with the methods illustrated in FIGS. 2 and 3 for commodity positioning. As illustrated in FIG. 4, the present disclosure further provides a commodity positioning method applicable to the map acquisition apparatus 30, comprising:

S32: scanning radio frequency identification labels provided for shelves to acquire shelf identity information of the shelves, wherein the shelf identity information is in one-to-one correspondence with the shelves;

S34: acquiring image information of the shelves;

S36: binding the shelf identity information with the image information to generate shelf image information;

S38: transmitting the shelf image information to a commodity positioning apparatus, or uploading and storing the shelf image information for acquisition by the commodity positioning apparatus, which enables the commodity positioning apparatus to:
  acquire map information marked with multiple pieces of shelf identity information;
  identify, according to the shelf image information, a commodity corresponding to each of electronic price label apparatuses on a corresponding shelf and a first positional relationship between each of the electronic price label apparatuses and the corresponding shelf;
  generate location information of each of the commodities according to the first positional relationship and the map information.

Specifically, the commodity positioning principle of the method illustrated in FIG. 4 may refer to that of the method illustrated in FIG. 2, and will not be repeated here.

Figure 5:
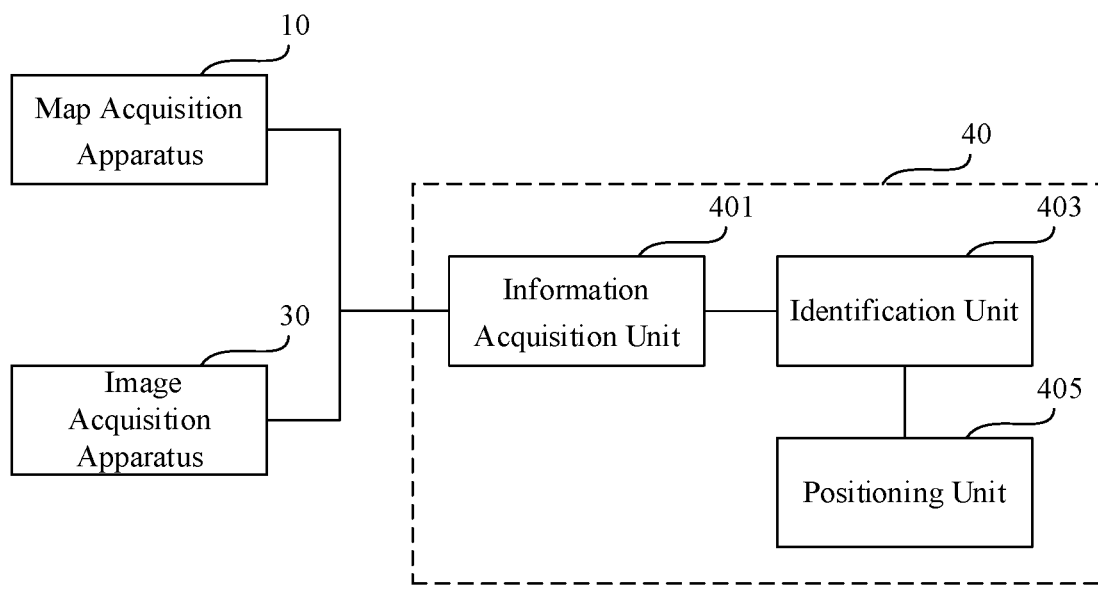
FIG. 5 illustrates a schematic structural diagram of a commodity positioning apparatus provided by an embodiment of the present disclosure.

FIG. 5 illustrates a structural schematic diagram of a commodity positioning apparatus provided by an embodiment of the present disclosure. The apparatus illustrated in FIG. 5 may correspondingly perform the method illustrated in FIG. 2.

As illustrated in FIG. 5, the present disclosure provides a commodity positioning apparatus 40, comprising an information acquisition unit 401, an identification unit 403 and a positioning unit 405.

The information acquisition unit 401 is configured to acquire map information marked with multiple pieces of shelf identity information, and acquire shelf image information corresponding to the shelf identity information, wherein the shelf identity information is in one-to-one correspondence with shelves 20;

the identification unit 403 is configured to identify, according to the shelf image information, a commodity corresponding to each of electronic price label apparatuses on a corresponding shelf 20 and a first positional relationship between each of the electronic price label apparatuses and the corresponding shelf 20;

the positioning unit 405 is configured to generate location information of each of the commodities according to the first positional relationship and the map information.

The commodity positioning principle of the apparatus illustrated in FIG. 5 may refer to that of the method illustrated in FIG. 2, and will not be repeated here.

Figure 6:
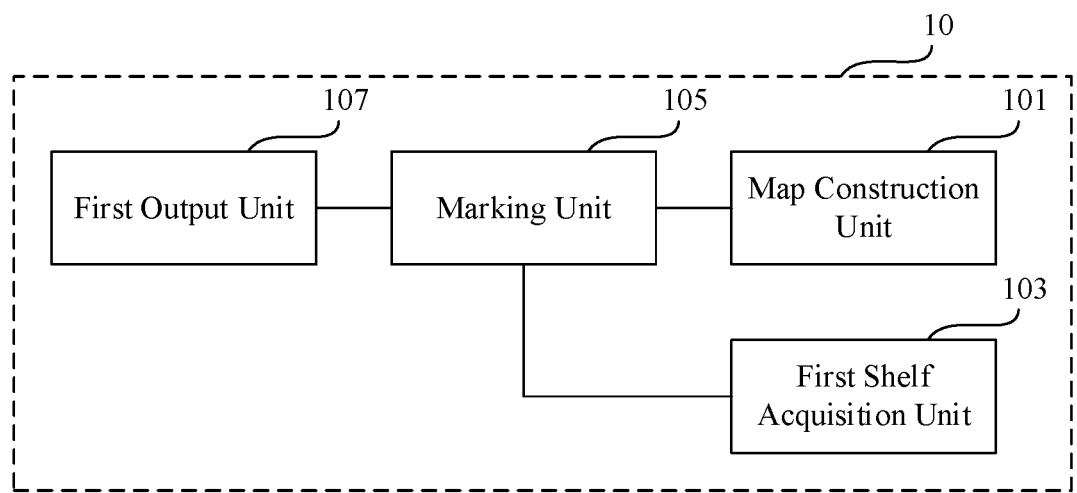
FIG. 6 illustrates a schematic structural diagram of a map acquisition apparatus provided by an embodiment of the present disclosure.

FIG. 6 illustrates a schematic structural diagram of a map acquisition apparatus provided by an embodiment of the present disclosure. The apparatus illustrated in FIG. 6 may correspondingly perform the method illustrated in FIG. 3.

As illustrated in FIG. 6, in this embodiment, the present disclosure further provides a map acquisition apparatus 10, comprising a map construction unit 101, a first shelf acquisition unit 103, a marking unit 105 and a first output unit 107.

The map construction unit 101 is configured to acquire and construct map data;

the first shelf acquisition unit 103 is configured to acquire shelf identity information of each of shelves, wherein the shelf identity information is in one-to-one correspondence with the shelves;

the marking unit 105 is configured to mark the map data according to each of the shelf identity information to generate map information marked with multiple pieces of shelf identity information;

the first output unit 107 is configured to transmit the map information to a commodity positioning apparatus 40 or upload and store the map information for acquisition by the commodity positioning apparatus 40, which enables the commodity positioning apparatus 40 to:

acquire shelf image information corresponding to the shelf identity information;

identify, according to the shelf image information, a commodity corresponding to each of electronic price label apparatuses on a corresponding shelf and a first positional relationship between each of the electronic price label apparatuses and the corresponding shelf;

generate location information of each of the commodities according to the first positional relationship and the map information.

The commodity positioning principle of the apparatus illustrated in FIG. 6 may refer to that of the method illustrated in FIG. 3, and will not be repeated here.

Figure 7:
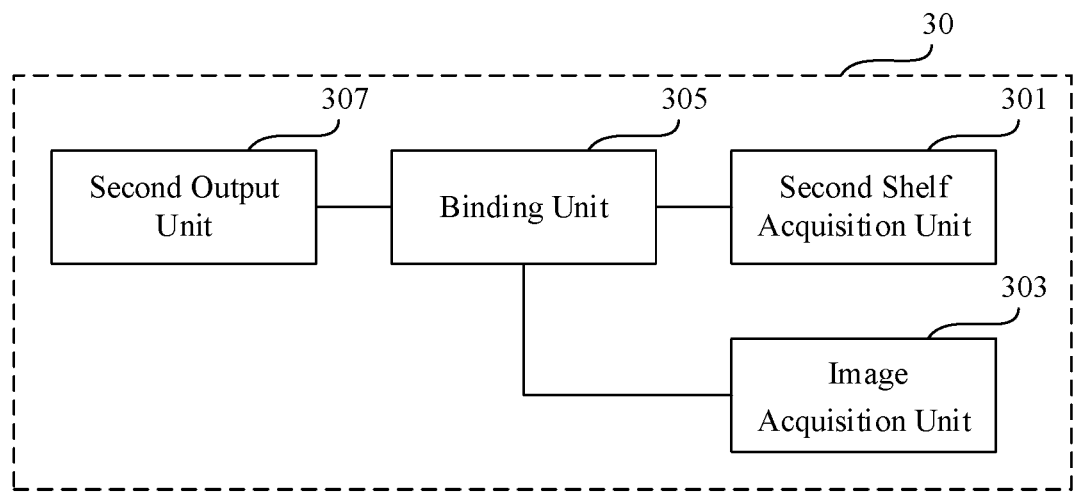
FIG. 7 illustrates a schematic structural diagram of an image acquisition apparatus provided by an embodiment of the present disclosure.

FIG. 7 illustrates a schematic structural diagram of an image acquisition apparatus provided by an embodiment of the present disclosure. The apparatus illustrated in FIG. 7 may correspondingly perform the method illustrated in FIG. 4.

As illustrated in FIG. 7, in this embodiment, the present disclosure further provides an image acquisition apparatus 30, comprising a second shelf acquisition unit 301, an image acquisition unit 303, a binding unit 305 and a second output unit 307.

The second shelf acquisition unit 301 is configured to scan radio frequency identification labels provided for shelves to acquire shelf identity information of the shelves, wherein the shelf identity information is in one-to-one correspondence with the shelves;

the image acquisition unit 303 is configured to acquire image information of the shelves;

the binding unit 305 is configured to bind the shelf identity information with the image information to generate shelf image information;

the second output unit 307 is configured to transmit the shelf image information to a commodity positioning apparatus 40, or upload and store the shelf image information for acquisition by the commodity positioning apparatus 40, which enables the commodity positioning apparatus 40 to:

acquire map information marked with multiple pieces of shelf identity information;

identify, according to the shelf image information, a commodity corresponding to each of electronic price label apparatuses on a corresponding shelf and a first positional relationship between each of the electronic price label apparatuses and the corresponding shelf;

generate location information of each of the commodities according to the first positional relationship and the map information.

The commodity positioning principle of the apparatus illustrated in FIG. 7 may refer to that of the method illustrated in FIG. 4, and will not be repeated here.

Further, the present disclosure also provides a commodity positioning system, comprising the commodity positioning apparatus 40 provided by any one of the above embodiments, a plurality of the map acquisition apparatuses 10 provided by any one of the above embodiments, a plurality of the image acquisition apparatuses 30 provided by any one of the above embodiments, and radio frequency identification labels and electronic price label apparatuses provided on each of the shelves 20.

Figure 8:
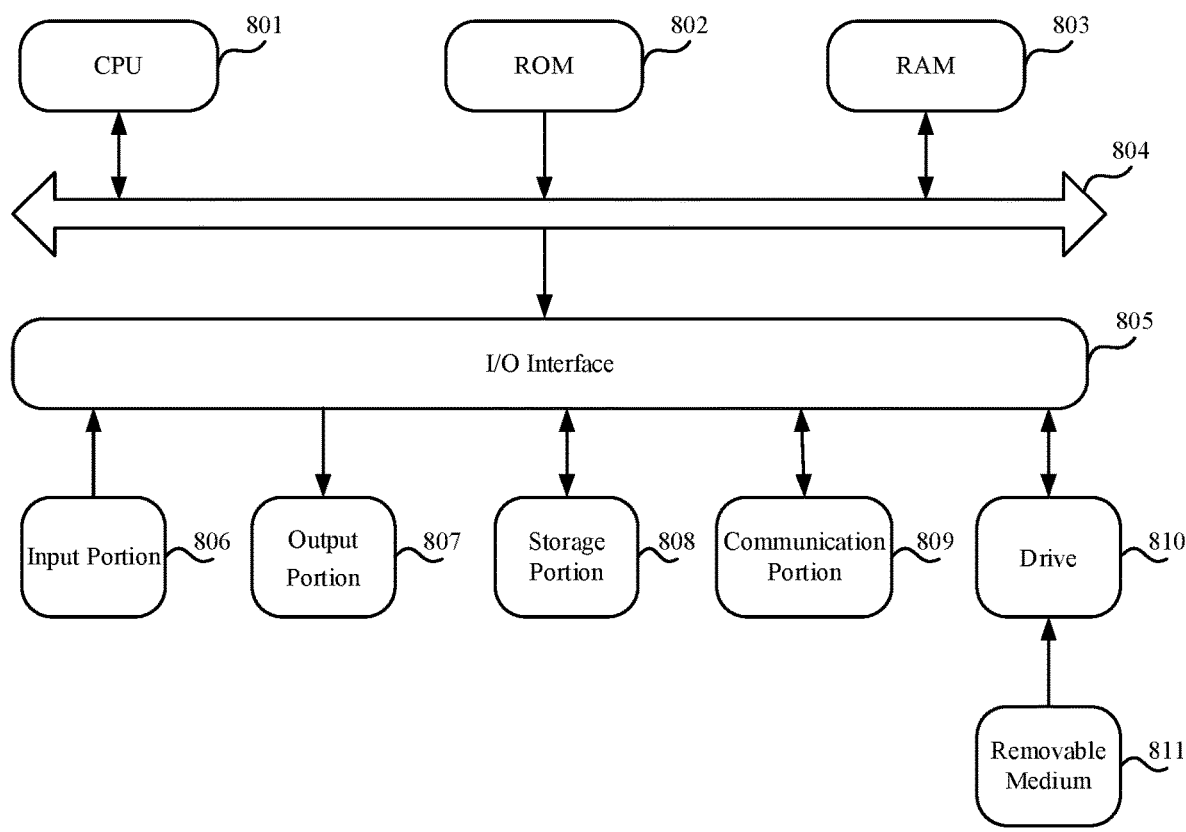
FIG. 8 illustrates a schematic structural diagram of a device provided by an embodiment of the present disclosure.

FIG. 8 illustrates a schematic structural diagram of a device provided by an embodiment of the present disclosure.

As illustrated in FIG. 8, as another aspect, the present disclosure further provides a device 800, comprising one or more central processing units (CPU) 801, which can perform various appropriate actions and processing according to programs stored in a read-only memory (ROM) 802 or programs loaded from a storage portion 808 into a random access memory (RAM) 803. The RAM 803 also stores therein various programs and data required for operations by the device 800. The CPU 801, the ROM 802, and the RAM 803 are connected to each other through a bus 804. An input/output (I/O) interface 805 is also connected to the bus 804.

The following components are connected to the I/O interface 805: an input portion 806 comprising a keyboard, a mouse, etc.; an output portion 807 comprising a cathode ray tube (CRT), a liquid crystal display (LCD), a speaker, etc.; a storage portion 808 comprising a hard disk, etc.; and a communication portion 809 comprising a network interface card such as a LAN card, a modem, etc. The communication portion 809 performs communication processing via a network such as the Internet. A drive 810 is also connected to the I/O interface 805 as needed. A removable medium 811, such as a magnetic disk, an optical disk, a magneto-optical disk, a semiconductor memory, etc., is installed on the drive 810 as needed, so that a computer program read therefrom can be installed into the storage portion 808 as needed.

Particularly, according to the embodiments of the present disclosure, the commodity positioning method described in any one of the above embodiments may be implemented as a computer software program. For example, an embodiment of the present disclosure includes a computer program product comprising a computer program that is tangibly contained on a machine-readable medium, the computer program comprising program codes for performing the commodity positioning method. In such an embodiment, the computer program may be downloaded and installed from the network through the communication portion 809, and/or installed from the removable medium 811.

As still another aspect, the present disclosure further provides a computer-readable storage medium, which may be a computer-readable storage medium included in the apparatus of the above embodiments, or existed alone without being assembled in the device. The computer-readable storage medium stores one or more programs which are used by one or more processors to perform the commodity positioning method described in the present disclosure.

The flowcharts and block diagrams in the drawings illustrate the implementable system architectures, functions, and operations of the systems, the methods, and the computer program products according to various embodiments of the present disclosure. In this regard, each block in the flowchart or block diagram can represent a module, a program segment, or a part of the codes, which contains one or more executable instructions for implementing specified logical functions. It should also be noted that in some alternative implementations, the functions marked in the blocks may also occur in a different order from that marked in the drawings. For example, two blocks illustrated in succession can actually be executed substantially in parallel, and they can sometimes be executed in a reverse order, depending on the functions involved. It should also be noted that each block in the block diagram and/or flowchart, and combinations thereof can be implemented by a dedicated hardware-based system that performs the specified functions or operations, by a combination of dedicated hardware and computer instructions.

The units or modules involved in the embodiments described in the present disclosure can be implemented by software or hardware. The described units or modules may also be provided in the processor. For example, each of the units may be a software program provided in a computer or a mobile intelligent device, or a separately provided hardware means. In which, the names of these units or modules do not constitute limitations of the units or modules themselves in some cases.

The above descriptions are just the preferred embodiments of the present disclosure and explanations of the applied technical principles. Those skilled in the art should understand that the scope of the invention involved in the present disclosure is not limited to the technical solutions formed by specific combinations of the above technical features, and should also cover other technical solutions formed by arbitrary combinations of the above technical features and their equivalents without departing from the concept of present disclosure, such as the technical solutions formed by mutually replacing the above technical features and those with similar functions disclosed in the present disclosure (but not limited thereto).

What is claimed is:

1. A commodity positioning method, comprising:
   acquiring map information marked with multiple pieces of shelf identity information, wherein the multiple pieces of shelf identity information are in one-to-one correspondence with shelves;
   acquiring shelf image information corresponding to the shelf identity information;
   identifying, according to the shelf image information, a commodity corresponding to each of electronic price label apparatuses on a corresponding shelf and a first positional relationship between each of the electronic price label apparatuses and the corresponding shelf; and
   generating location information of each of the commodities according to the first positional relationship and the map information, thereby automatically and accurately positioning commodities,
   wherein the map information is generated by a map acquisition apparatus acquiring and constructing map data and acquiring the shelf identity information of each of the shelves, and then marking the map data according to each of the shelf identity information, wherein the map acquisition apparatus comprises: a shopping cart component provided with a map construction system and a radio frequency identification reader.

2. The commodity positioning method according to claim 1, wherein the acquiring map information marked with multiple pieces of shelf identity information comprises any one of:
   receiving the map information transmitted by the map acquisition apparatus; and
   acquiring, from a server, the map information as pre-stored.

3. The commodity positioning method according to claim 1, wherein the acquiring shelf image information corresponding to the shelf identity information comprises any one of:
   receiving the shelf image information transmitted by an image acquisition apparatus; and
   acquiring, from a server, the shelf image information as pre-stored;
   wherein the shelf image information is generated by the image acquisition apparatus scanning radio frequency identification labels provided for the shelves to acquire the shelf identity information, and then acquiring image information of the shelves and binding the shelf identity information with the image information.

4. The commodity positioning method according to claim 3, wherein the image acquisition apparatus comprises at least one of:
   an electronic price label apparatus provided with an image acquisition apparatus and a radio frequency identification reader;
   an intelligent mobile terminal device provided with an image acquisition apparatus and a radio frequency identification reader; and
   a robot provided with an image acquisition apparatus and radio frequency identification reader.

5. A commodity positioning method, comprising:
   acquiring and constructing map data, and acquiring shelf identity information of each of shelves, wherein the shelf identity information is in one-to-one correspondence with the shelves;
   marking the map data according to each of the shelf identity information, and generating map information marked with multiple pieces of shelf identity information; and
   transmitting the map information to a commodity positioning apparatus or uploading and storing the map information for acquisition by the commodity positioning apparatus, which enables the commodity positioning apparatus to perform the method according to claim 1.

6. A commodity positioning method, comprising:
   scanning radio frequency identification labels provided for shelves to acquire shelf identity information of the shelves, wherein the shelf identity information is in one-to-one correspondence with the shelves;
   acquiring image information of the shelves;
   binding the shelf identity information with the image information to generate shelf image information; and
   transmitting the shelf image information to a commodity positioning apparatus, or uploading and storing the shelf image information for acquisition by the commodity positioning apparatus, which enables the commodity positioning apparatus to perform the method according to claim 1.

7. A commodity positioning apparatus, comprising:
   an information acquisition unit configured to acquire map information marked with multiple pieces of shelf identity information, and acquire shelf image information corresponding to the shelf identity information, wherein the shelf identity information is in one-to-one correspondence with shelves;
   an identification unit configured to identify, according to the shelf image information, a commodity corresponding to each of electronic price label apparatuses on a corresponding shelf and a first positional relationship between each of the electronic price label apparatuses and the corresponding shelf; and
   a positioning unit configured to generate location information of each of the commodities according to the first positional relationship and the map information, thereby automatically and accurately positioning commodities,
   wherein the map information is generated by a map acquisition apparatus acquiring and constructing map data and acquiring the shelf identity information of each of the shelves, and then marking the map data according to each of the shelf identity information, wherein the map acquisition apparatus comprises: a shopping cart component provided with a map construction system and a radio frequency identification reader.

8. The commodity positioning apparatus according to claim 7, wherein the information acquisition unit is further configured to receive the map information transmitted by the map acquisition apparatus, and/or acquire, from a server, the map information as pre-stored.

9. The commodity positioning apparatus according to claim 7, wherein the information acquisition unit is further configured to receive the shelf image information transmitted by an image acquisition apparatus, and/or acquire, from a server, the shelf image information as pre-stored; and
wherein the shelf image information is generated by the image acquisition apparatus scanning radio frequency identification labels provided for the shelves to acquire the shelf identity information, and then acquiring image information of the shelves and binding shelf identity information with the image information.

10. A map acquisition apparatus, comprising:
a map construction unit configured to acquire and construct map data;
a first shelf acquisition unit configured to acquire shelf identity information of each of shelves, wherein the shelf identity information is in one-to-one correspondence with the shelves;
a marking unit configured to mark the map data according to each of the shelf identity information to generate map information marked with multiple pieces of shelf identity information; and
a first output unit configured to transmit the map information to the commodity positioning apparatus according to claim 7 or upload and store the map information for acquisition by the above commodity positioning apparatus.

11. The map acquisition apparatus according to claim 10, wherein
the first shelf acquisition unit is configured as a radio frequency identification reader.

12. An image acquisition apparatus, comprising:
a second shelf acquisition unit configured to scan radio frequency identification labels provided for shelves to acquire shelf identity information of the shelves, wherein the shelf identity information is in one-to-one correspondence with the shelves;
an image acquisition unit configured to acquire image information of the shelves;
a binding unit configured to bind the shelf identity information with the image information to generate shelf image information; and
a second output unit configured to transmit the shelf image information to the commodity positioning apparatus according to claim 8, or upload and store the shelf image information for acquisition by the above commodity positioning apparatus.

13. The image acquisition apparatus according to claim 12, wherein the image acquisition apparatus is configured as at least one of an electronic price label apparatus, an intelligent mobile terminal apparatus and a robot; and
the second shelf acquisition unit is configured as a radio frequency identification reader.

14. A commodity positioning system, comprising the commodity positioning apparatus according to claim 7, a plurality of the map acquisition apparatuses, a plurality of the image acquisition apparatuses, and radio frequency identification labels and electronic price label apparatuses provided on each of the shelves,
wherein each of the plurality of the map acquisition apparatuses comprises:
a map construction unit configured to acquire and construct map data;
a first shelf acquisition unit configured to acquire shelf identity information of each of shelves, wherein the shelf identity information is in one-to-one correspondence with the shelves;
a marking unit configured to mark the map data according to each of the shelf identity information to generate map information marked with multiple pieces of shelf identity information; and
a first output unit configured to transmit the map information to the commodity positioning apparatus or upload and store the map information for acquisition by the commodity positioning apparatus,
wherein each of the plurality of the image acquisition apparatuses comprises:
a second shelf acquisition unit configured to scan radio frequency identification labels provided for shelves to acquire shelf identity information of the shelves, wherein the shelf identity information is in one-to-one correspondence with the shelves;
an image acquisition unit configured to acquire image information of the shelves;
a binding unit configured to bind the shelf identity information with the image information to generate shelf image information; and
a second output unit configured to transmit the shelf image information to the commodity positioning apparatus, or upload and store the shelf image information for acquisition by the above commodity positioning apparatus.

15. A device for commodity positioning, comprising:
one or more processors; and
a memory for storing one or more programs,
wherein when the one or more programs are executed by the one or more processors, the one or more processors are enabled to perform the method according to claim 1.

16. A non-transitory computer-readable storage medium with a computer program stored thereon, wherein the computer program, when being executed by a processor, implements the method according to claim 1.

* * * * *